US008070437B2

(12) United States Patent  (10) Patent No.: US 8,070,437 B2
Nielsen et al.  (45) Date of Patent: *Dec. 6, 2011

(54) METHOD FOR DAMPING EDGEWISE OSCILLATIONS IN ONE OR MORE BLADES OF A WIND TURBINE, AN ACTIVE STALL CONTROLLED WIND TURBINE AND USE HEREOF

(75) Inventors: Thomas Steiniche Bjertrup Nielsen, Randers SV (DK); Bo Juul Pedersen, Hadsten (DK); Christopher John Spruce, Surrey (GB)

(73) Assignee: Vestas Wind Systems A/S, Randers SV (DK)

( * ) Notice: Subject to any disclaimer, the term of this patent is extended or adjusted under 35 U.S.C. 154(b) by 0 days.

This patent is subject to a terminal disclaimer.

(21) Appl. No.: 12/480,374

(22) Filed: Jun. 8, 2009

(65) Prior Publication Data

US 2009/0246020 A1 Oct. 1, 2009

Related U.S. Application Data

(63) Continuation of application No. PCT/DK2007/000520, filed on Nov. 26, 2007.

(30) Foreign Application Priority Data

Dec. 8, 2006 (DK) .................................. 2006 01618

(51) Int. Cl.
*F03D 7/04* (2006.01)
(52) U.S. Cl. ................................ 416/1; 416/61; 416/500
(58) Field of Classification Search .................... 416/39, 416/98, 1, 61, 500
See application file for complete search history.

(56) References Cited

U.S. PATENT DOCUMENTS

| 4,297,076 | A  | * | 10/1981 | Donham et al. | ................ | 416/37 |
| 6,320,273 | B1 |   | 11/2001 | Nemec         |                  |        |
| 6,525,518 | B1 | * | 2/2003  | Garnaes       | .................... | 324/76.13 |
| 7,400,055 | B2 | * | 7/2008  | Nagao         | ............... | 290/44 |
| 7,470,114 | B2 | * | 12/2008 | Bonnet        | ..................... | 416/226 |
| 7,854,589 | B2 | * | 12/2010 | Nielsen et al. | ................... | 416/1 |
| 2009/0169378 | A1 | * | 7/2009 | Menke         | ................ | 416/1 |
| 2009/0185901 | A1 | * | 7/2009 | Nielsen et al. | ................... | 416/1 |

FOREIGN PATENT DOCUMENTS

| DE | 2930062  | B1 | 2/1980  |
| DE | 10044262 | A1 | 3/2002  |
| EP | 1816347  | A1 | 8/2007  |
| GB | 2117934  | A  | 10/1983 |
| WO | 9932789  | A1 | 7/1999  |
| WO | 9957435  | A1 | 11/1999 |

(Continued)

OTHER PUBLICATIONS

Danish Search Report; PA 2006 01618; Jun. 28, 2007; 1 page.

(Continued)

*Primary Examiner* — Edward Look
*Assistant Examiner* — Ryan Ellis
(74) *Attorney, Agent, or Firm* — Wood, Herron & Evans, L.L.P.

(57) ABSTRACT

A method for damping edgewise oscillations in one or more blades of a wind turbine includes the steps of detecting if one or more of the blades oscillates edgewise during operation of the wind turbine, and substantially cyclically generating a pitch angle difference between at least two of the blades. Further provided is an active stall controlled wind turbine and use hereof.

13 Claims, 5 Drawing Sheets

FOREIGN PATENT DOCUMENTS

| WO | 2004074681 A1 | 9/2004 |
| WO | 2005090781 A1 | 9/2005 |
| WO | 2007073736 A1 | 7/2007 |

OTHER PUBLICATIONS

Trudnowski D et al: "Independent pitch control using rotor position feedback for wind-shear and gravity fatigue reduction in a wind turbine" 20020508; 20020508—20020510, vol. 6, May 8, 2002, pp. 4335-4340, XP010597604.

International Preliminary Report on Patentability; PCT/DK2007/000520; May 29, 2009; 9 pages.

International Search Report and Written Opinion of the International Searching Authority; PCT/DK2007/000520; Aug. 7, 2008; 9 pages.

* cited by examiner

METHOD FOR DAMPING EDGEWISE OSCILLATIONS IN ONE OR MORE BLADES OF A WIND TURBINE, AN ACTIVE STALL CONTROLLED WIND TURBINE AND USE HEREOF

CROSS-REFERENCE TO RELATED APPLICATIONS

The present application is a continuation of pending International patent application PCT/DK2007/000520 filed on Nov. 26, 2007 which designates the United States and claims priority from Danish patent application PA 2006 01618 filed on Dec. 8, 2006, the content of which is incorporated herein by reference.

FIELD OF THE INVENTION

The invention relates to a method for damping edgewise oscillations in one or more blades of a wind turbine, an active stall controlled wind turbine and use hereof.

BACKGROUND OF THE INVENTION

A wind turbine known in the art comprises a tapered wind turbine tower and a wind turbine nacelle positioned on top of the tower. A wind turbine rotor with a number of wind turbine blades is connected to the nacelle through a low speed shaft, which extends out of the nacelle front as illustrated on FIG. 1.

Oscillations and vibrations of the wind turbine blades are undesirable in that, they can damage the blades in worse case. In particular edge-wise oscillations, which are oscillations along the chord between the trailing edge and the leading edge of the blade, can damage the blade, in that the blade has little damping towards this mode of oscillations.

Furthermore, edgewise oscillations are particularly harmful, in that they among other things can cause cracks at the root of the blade or along the trailing edge. In known cases such oscillations has caused the blade to fail to such a degree, that the blade has disintegrated from the turbine.

Both stall and pitch controlled wind turbine are in risk of being damaged by edge-wise oscillations. The stall controlled turbine is mostly seeing this problem when operating in high winds beyond the stall point and the pitch regulated turbine is mostly seeing this problem in medium wind where sudden wind gusts can cause the blades to stall momentarily.

To eliminate harmful oscillations of the blades it is known to shut down the wind turbine for a period of time, if potentially damaging edgewise oscillations of the blades is detected. But if these oscillations are detected often, this method will seriously reduce the overall output of the wind turbine.

It is also known to provide the blades with different forms of mechanical dampers, most often based on the principle of a spring mounted mass combined with a damping device or they can be provided with different kinds of liquid dampers.

An example of a liquid damper is disclosed in WO 99/32789, where the tips of the blades are provided with a tuned liquid damper system. A liquid flows freely in a number of cambers placed as close to the tip of the blade as possible. The chambers have a specific length, which is adapted to the natural edgewise frequency of the specific blade type.

Even though these kinds of frequency specific dampers weigh less than traditional multi-frequency dampers, they still have the disadvantage of adding considerable weight to the tip of the blade, where weight is least desired and under all circumstances it is undesired to provide anything that can break down in the blades, both because the inside of the blades can be very difficult to access and because any extra weight in the blades is undesired.

An object of the invention is to provide for a wind turbine comprising means for damping or eliminating edgewise oscillations in the blades, which do not present the mentioned disadvantages.

Furthermore, it is an object of the invention to provide for a simple and cost-efficient technique for damping or eliminating edgewise oscillations of one or more blades of a wind turbine.

SUMMARY OF THE INVENTION

The invention provides for a method for damping edgewise oscillations in one or more blades of a wind turbine. The method comprises the steps of detecting if one or more of the blades oscillates edgewise during operation of the wind turbine, and substantially cyclically generating a pitch angle difference between at least two of the blades.

Edgewise oscillations of a blade will result in deflections of the centre of the hub, on which the blade is attached. These deflections are synchronous with the oscillations and by cyclically generating a pitch angle difference between at least two of the blades the deflections can be disrupted, whereby the oscillations are dampened.

Most modern wind turbines are by their nature provided with the ability to change the pitch angle of the blades and thereby adjust the blades angle of attack to control the power output of the rotor or the wind turbine, to protect the blades or the wind turbine from damaging overloads or other.

The ability to pitch the wind turbine blades is therefore already present in most modern wind turbines and by using this ability to cyclically generating a pitch angle difference between at least two of the blades when edgewise oscillations are detected provides for a simple and cost-efficient way of damping edgewise oscillations of a wind turbine blade.

It should be emphasised that by the term "during operation" is to be understood that the wind turbine is producing power to a utility grid i.e. the rotor of the wind turbine is not stopped and the rotor is not just idling making the generator only produce power to sustain the wind turbine itself.

In an aspect of the invention, said pitch angle difference is only generated if the size of said edgewise oscillations is above a predefined level in one or more of said blades.

Changing the blades pitch angle from their substantially optimal position power-production-wise, could reduce the power output of the wind turbine and cyclically pitching one or more of the blades constantly will also wear the blades pitch mechanism, so if the size of the edgewise oscillations is only minor and/or non-damaging, it is advantageous to refrain from pitching the blades if the size of the oscillations is below a certain level.

In an aspect of the invention, the size of said pitch angle difference is generated substantially directly proportional to the size of said edgewise oscillations.

Hereby it is possible to create a simple and efficient control algorithm which efficiently adapts the generated pitch angle difference to the size of the oscillations.

In an aspect of the invention, said pitch angle difference between at least two of said blades generates an asymmetric load situation on the hub centre of a rotor to which said blades are attached.

By establishing an asymmetric load situation in the rotorplane on the hub centre of the rotor it is possible to deflect the hub centre e.g. making the centre describe an ellipse during rotation of the rotor. This deflection can disturb the edgewise motion of the blades and thereby dampen it.

In an aspect of the invention, said asymmetric load situation generated by said pitch angle difference substantially counter-phases an asymmetric load situation generated by said edgewise oscillations.

The frequency of the asymmetric load situation generated by the split pitch can online be tuned to fit the frequency of the asymmetric load situation generated by the edgewise vibrations and by making the asymmetric load situation—generated by the pitch angle difference—substantially counter-phases the asymmetric load situation—generated by the edgewise oscillations—it is possible to counteract the edgewise oscillations of the blades and thereby dampen the oscillations more efficiently.

In an aspect of the invention, the sum of the thrust provided by said blades are being substantially maintained when generating said pitch angle difference between at least two of said blades.

At some sites around the world, the wind conditions can result in that potentially damaging edgewise blade oscillations occur constantly. It is therefore advantageous that the rotor thrust is substantially maintained, when carrying out a method for damping or eliminating these oscillations, in that it hereby is possible to substantially maintain the wind turbines total power output even though tower oscillations is dampened.

In an aspect of the invention, said pitch angle difference is generated by offsetting the pitch angle of at least a first blade in a first direction and offsetting the pitch angle of at least one further blade in the opposite direction of said first direction.

By offsetting at least on blade positive and offsetting at least one further blade negative, the power output of one blade is substantially increased and the power output of another blade is substantially reduced, hence the overall power output of the rotor is substantially maintained.

In an aspect of the invention, said offset is generated in addition to the normal pitch angle algorithm controlling the pitch angle of said blades in relation normal wind turbine control parameters such to load, power output, wind speed, noise emission, tower vibrations and/or other.

By making this change in pitch angle relative—meaning that it is an extra change aside from the pitch angle change being preformed to optimise the blades angle to the incoming wind in relation to power output, load, noise or other—it is possible to still optimize the blades pitch angle to one or more of these control parameters even though a cyclically pitch angle difference is created. This is advantageous in that it hereby is possible to maintain the power output of the wind turbine or at least reduce the loss in power output.

In an aspect of the invention, said edgewise oscillations are detected by use of one or more oscillation sensors placed in one or more of said blades.

By placing the oscillation sensors in the blades it is possible to obtain much more precise information of the individual blades edgewise oscillation conditions. This is advantageous in that it hereby is possible to counteract the motion of the hub centre more exactly and thereby dampen the oscillations more efficiently.

In an aspect of the invention, said edgewise oscillations are detected by use of one or more oscillation sensors placed in or at the rotational axis of a rotor on which said blades is mounted.

By placing the oscillation sensors in or at the rotational axis of the rotor it is possible to place the sensors in the nacelle or in the rotor hub, where the sensors are much easier accessed.

In an aspect of the invention, said oscillation sensors are one or more accelerometers, in that accelerometers are a simple and cost-efficient means for detecting oscillations.

In an aspect of the invention, the gain of a control algorithm controlling the relation between said pitch angle difference and said edgewise oscillations is increased if the size of said edgewise oscillations rises above a predefined level.

When the gain is increased it is possible that the power output of the wind turbine is reduced, but if the edgewise oscillations rises above a predefined level the risk of the blades being damaged is also increased and it is therefore advantageous to increase the gain to protect the blades.

In an aspect of the invention, a gain of a control algorithm is controlling the relation between the time derivatives of said pitch angle difference and said edgewise oscillations.

If the gain is controlling the relation between the time derivatives of the pitch angle difference and the edgewise oscillations it is possible for the control algorithm to control the pitch angle difference more accurate in relation to the edgewise oscillations, particularly regarding fast changes in the edgewise oscillation level.

The invention further provides for an active stall controlled wind turbine comprising control means for carrying out a method as described above.

Providing an active stall controlled wind turbine with control means for carrying out the mentioned method is advantageous, in that due to the fact that the blades of active stall controlled wind turbines stalls during normal operation, the chance of edgewise oscillations occurring is particularly high with this type of wind turbine. Furthermore, the design of the blades on active stall controlled wind turbines makes them particularly vulnerable to edgewise oscillations and it is therefore particularly advantageously to use this method on an active stall controlled wind turbine.

Even further the invention provides for use of an active stall controlled wind turbine as described above in a wind turbine park comprising at least two active stall controlled wind turbines.

If the wind situation creates edgewise oscillations in the blades of one wind turbine in a wind turbine park, there is a high probability that the wind situation will also create edgewise oscillations in the blades of other wind turbines in the park. If many wind turbines in a park are shut down substantially simultaneously due to critical edgewise oscillations of the blades, it is particularly critical because it is difficult for the power company to compensate for this sudden large loss in power, and it is therefore particularly advantageous to use an active stall controlled wind turbine according to the invention in a wind turbine park, in that an active stall controlled wind turbine according to the invention much more often will maintain the power production and even if it occasionally has to shut down—to prevent edgewise oscillations from damaging the blade—the risk of several wind turbines according to the invention in the same wind turbine park shutting down simultaneously is greatly reduced.

BRIEF DESCRIPTION OF THE DRAWINGS

The invention will be described in the following with reference to the figures in which FIG. 1. illustrates a large modern wind turbine known in the art, as seen from the front.

DETAILED DESCRIPTION OF THE INVENTION

Figure 1:
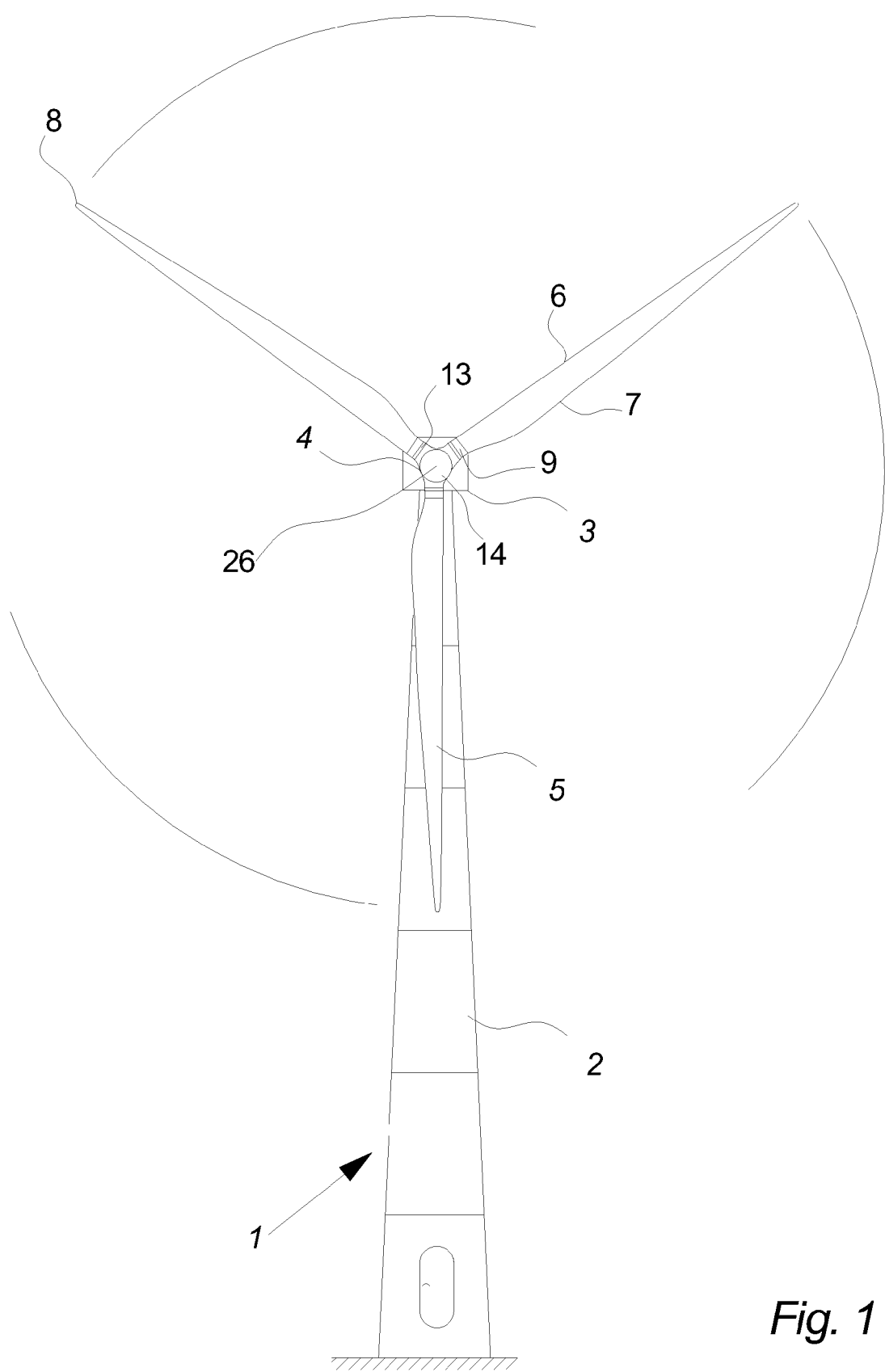

FIG. 1 illustrates a modern wind turbine 1, comprising a tower 2 and a wind turbine nacelle 3 positioned on top of the tower 2. The wind turbine rotor 4, comprising three wind turbine blades 5, is connected to the nacelle 3 through the low speed shaft which extends out of the nacelle 3 front.

Each of the blades 5 comprise a tip 8 and a root 9 and at the root 9 each of the blades 5 are provided with a pitch mechanism 13, enabling that the blades 5 can be rotated individually around their longitudinal axis.

Figure 2:
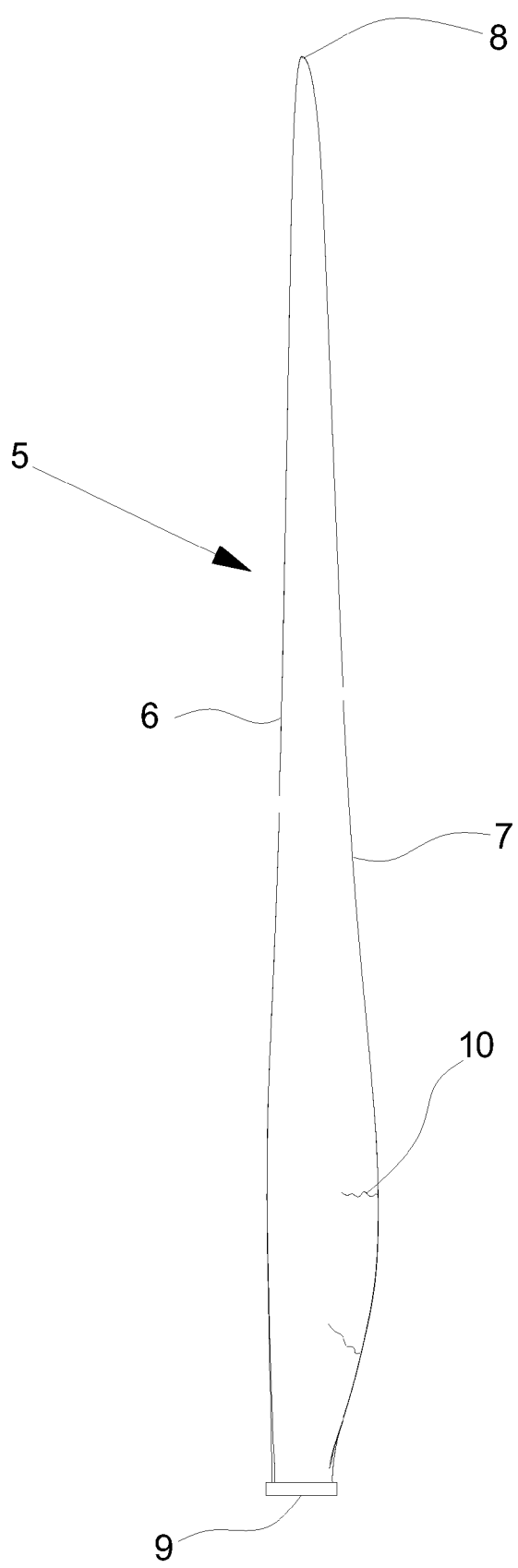
FIG. 2 illustrates a wind turbine blade, as seen from the front.

FIG. 2 illustrates a wind turbine blade 5, as seen from the front/pressure side 11. The wind turbine blade 5 comprises a leading edge 6, a trailing edge 7, a tip 8 and a root 9. A wind turbine blade 5 known in the art is typically made of a glass fibre and resin composite reinforced by carbon fibre, carbon fibre reinforced wood or a combination hereof.

A wind turbine blade 5 known in the art, has an elastic centre which is closer to the leading edge 6 than to the trailing edge 7, at least regarding most parts of the blade 5. If edgewise oscillations occur at a frequency at or close to the blades first natural edgewise frequency, especially the trailing edge 7 is therefore exposed to considerable strain, which under certain conditions can damaged the blade 5 and result in cracks 10 along the trailing edge 7.

Figure 3:
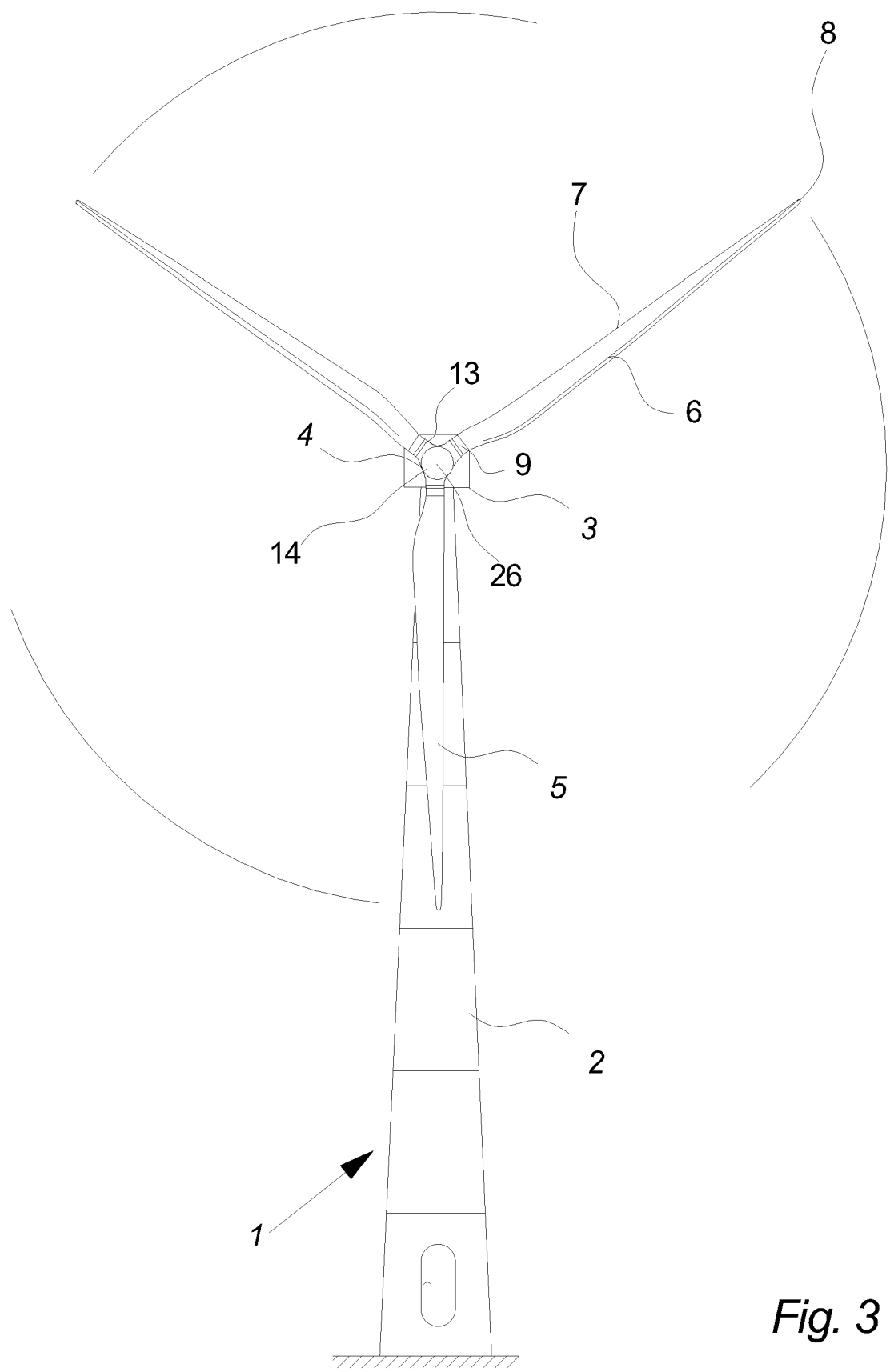
FIG. 3 illustrates an wind turbine comprising blades in different pitch angles, as seen from the front.

FIG. 3 illustrates a wind turbine 1 comprising three blades 5 each positioned in a pitch angle different from the pitch angle of the two other blades 5, as seen from the front.

In this embodiment the different pitch angles are cyclically generated by not offsetting the pitch angle of the first blade 5, offsetting the pitch angle of the second blade +0.50 and offsetting the pitch angle of the third blade −0.5°. In another embodiment the blades 5 could be offset to different pitch angles or the order or the magnitude of which the blades 5 are pitched could be different.

In this embodiment the wind turbine 1 is an active stall controlled wind turbine 1 but in another embodiment the wind turbine 1 could be a pitch controlled wind turbine 1 or another type of wind turbine 1 as long as it comprises means for adjusting and controlling the pitch angle of the blades 5. The difference between active stall controlled wind turbines 1 and pitch controlled wind turbines 1 will be further discussed under FIGS. 4 and 5.

When certain wind conditions are present—such as the wind speed is within a specific range, the wind being particularly high turbulent and/or other, there is a risk of edgewise oscillations in the blades 5 occurring.

When edgewise oscillations occur it is usually in a form which induces an asymmetrical load on the rotor hub 14 centre. This could e.g. be because only one blade 5 was oscillating, if two blades 5 were oscillating against and away from each other in time, if two blades 5 where oscillating in the same direction in time each at half the amplitude of a third blade 5 oscillating in the opposite direction or another edgewise oscillating mode which would inflict an unbalanced load situation in the hub 14 centre. This asymmetrical load causes the hub 14 centre to deflect in an elliptical orbit due to summed inertial loading from the progressive and regressive edgewise blade 5 whirling mode.

In this embodiment of the invention these edgewise oscillations of the blades 5 is dampened by cyclically generating a pitch angle difference between all the blades 5 of the rotor 4 but in another embodiment it could also be done by cyclically generating a pitch angle difference between at least two of the blades 5.

In this embodiment the pitch angle difference induces an aerodynamic force in the hub 14 centre which through a control algorithm in control means 25 is brought to counter-phase with the velocity of the elliptical orbital describing the hub 14 centre deflection due to summed inertial loading from the progressive and regressive edgewise oscillations of the blades 5. In other words—the forces originating from the edgewise oscillations and acting on the hub 14 centre is by use of the control means being counter-phase with forces acting on the hub 14 centre which originates from cyclically generating a pitch angle difference, hereby damping or eliminating these oscillations.

In this embodiment of the invention the wind turbine 1 comprises control means 25 which controls the size of the generated pitch angle difference i.e. the size of the counter-phased force acting on the hub 14 centre in direct proportion with the size of the edgewise oscillations of the blades i.e. the size of the force generated by the edgewise oscillations acting on the hub 14 centre.

In another embodiment of the invention the relation between the input signal (the magnitude of the deflection of the hub 14 centre, the size of the edgewise oscillations or other) and the output signal (the size of the pitch angle difference) could be exponential, it could be controlled in steps (if the edgewise oscillations are within a certain predefined range, the size of the pitch angle difference is offset a certain predefined size) or other.

On active stall controlled wind turbines 1, pitch controlled wind turbines 1 and other wind turbines 1 comprising pitch mechanisms 13 the blades 5 can be pitched on the basis of many different wind turbine control parameters such load, thrust, wind speed, rotation speed, noise emission, tower vibrations and/or other. When the pitch angle difference is generated it is by offsetting the pitch angle of one or more of the blades 5 in relation to the normal pitch angle algorithm controlling the pitch angle of the blades 5.

By cyclically creating this heterogeneous pitch angle situation (as illustrated in FIG. 3) it is possible to substantially maintain the overall power output of the rotor 4, in that the power output of a first blade 5 is unchanged, the power output of a second blade 5 is slightly increased and the power output of a third blade 5 is slightly reduced.

In another embodiment of the invention the pitch angle of only one blade 5 is offset, leaving the pitch angle of the remaining blades 5 unchanged during the cyclic attempt to dampen or eliminate edgewise oscillations of the blades 5.

In this embodiment of the invention the wind turbine 1 comprise three blades 5 but in another embodiment the wind turbine 1 could comprise another number of blades such as two, four or more.

If the wind turbine 1 only comprised two blades 5 only the pitch angle of one of the blades 5 could be offset to generate the pitch angle difference or both blades 5 could be offset in opposite directions.

If the wind turbine 1 comprised four or more blades the pitch angle difference could be enabled e.g. by pairing the blades 5 and then offsetting the pitch angles of these pairs in different directions or e.g. by offsetting the blades' pitch angles in opposite directions alternately or otherwise.

In this embodiment of the invention the control means 25 further comprise a dead band or another control method which ensures that the pitch angle difference is only created when the edgewise oscillations of the blades 5 are above a certain predefined level.

Furthermore, in this embodiment of the invention the control means 25 also comprise means for increasing the gain of the control means if the size of the oscillations rises above a certain predefined level, if the size of the oscillations has not been dampened below a predefined level within a certain predefined time or if the size of the oscillations has been above a certain predefined level for at least a certain predefined time.

The gain is the part of the control algorithm in the control means 25 which controls the size of the reaction at a given oscillation level e.g. by controlling how much the input signal (the amplitude of the edgewise oscillations) is amplified in the control algorithm in the control means 25, hereby controlling how big a counter-phased forced is created in the hub 14 centre by controlling the pitch angle difference created at a given input signal.

An even further way of controlling the dampening process is as follows: Vibration sensor (accelerometers, strain gauges, etc.) picks up signals from at least two of the wind turbine blades 5 to detect the edgewise oscillations status. It is possibly to decompose the edgewise vibrations into two sub-modes (progressive and regressive rotor 4 whirling—modes involving all three blades 5) and to identify the time dependent magnitude of the corresponding mode amplitudes. Since any edgewise deflection on the blades 5 can be described by a linear combination of the two submodes, it is possibly to separate the cyclic split pitch action i.e. the pitch angle differences to suppress the two submodes, and to superimpose the corresponding two split pitch demands (onto the collective pitch demand). The frequencies at which split pitch is active will be different from each of the two modes (if the blade 5 edgewise mode is strictly in-plane the frequency difference between the two will be 1P, but that is not necessary so). This control approach is denoted modal-control, i.e. two parallel PI(D) controllers perform/control the pitch angle differences (the cyclic split pitch) to suppress the two edgewise rotor 4 whirling modes.

Figure 4:
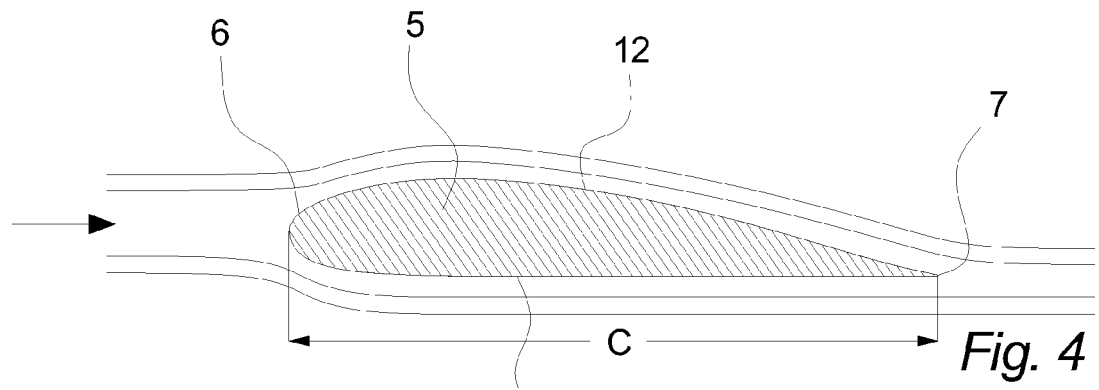
FIG. 4 illustrates a cross-section of a wind turbine blade in a non-stall situation, as seen from the root of the blade.

FIG. 4 illustrates a cross-section of a wind turbine blade 5 in a non-stall situation, as seen from the root 9 of the blade 5.

The blade 5 illustrated in FIG. 4 is a blade 5 on an ordinary pitch regulated wind turbine 1, shown during normal operation. In another embodiment it could also be a blade 5 on an active stall regulated wind turbine 1, operating in low wind or during start up before the blade 5 starts to stall.

On a pitch controlled wind turbine 1 the turbines electronic controller checks the power output of the turbine 1 e.g. several times per second. When the power output becomes too high, the controller sends an order to the blade pitch mechanism 13, which immediately pitches (turns) the rotor blades 5 slightly out of the wind. Likewise, the blades 5 are turned back into the wind whenever the wind drops again. During normal operation the blades 5 of a pitch regulated wind turbine 1 usually only pitch a fraction of a degree at a time—and the rotor 4 will be turning at the same time.

Most known pitch controlled wind turbines 1 do not comprise detection means 21 for detecting edgewise oscillations of the blades 5 and do therefore neither comprise active means for damping or eliminating these vibrations. When providing a pitch controlled wind turbine 1 with means according to the invention, it is therefore possible to increase the output of the blades 5, because it is possible to reduce the margin of safety to stall, in that means is hereby provided to the wind turbine 1 for damping or eliminating damaging edgewise oscillations if they should occur.

On a pitch controlled wind turbine 1, the controller will generally pitch the blades 5 slightly every time the wind changes in order to keep the rotor blades 5 at the optimum angle in order to maximise output for all wind speeds or at least up to a certain wind speed such as 25 meters/sec., where the blades 5 are turned completely out of the wind—making the blade chord C (the line between the trailing edge 7 and the leading edge 6) substantially parallel with the wind direction, making the rotor 4 stop rotating or at least making it idle. Doing this protects the blades 5 from damaging overload at high wind speeds and this is one of the reasons that the blades 5 of a pitch controlled wind turbine 1 can be made relative long and slender, compared to blades 5 of an active stall regulated wind turbine 1.

The blades 5 on a pitch controlled wind turbine 1 do usually not stall during normal operation, in that the blades 5 are pitched out of the wind before stall can occur. But under certain circumstances gusts of wind can arise so fast, that the turbines 1 control is not able to react fast enough and for a short period of time stall can occur. These short stall periods can induce edgewise oscillations in the blade 5, which potentially can be very damaging. Particularly if these gusts happen rhythmically at a frequency at or close to the blades 5 first natural edgewise frequency the energy of the edgewise oscillations can build up.

Figure 5:
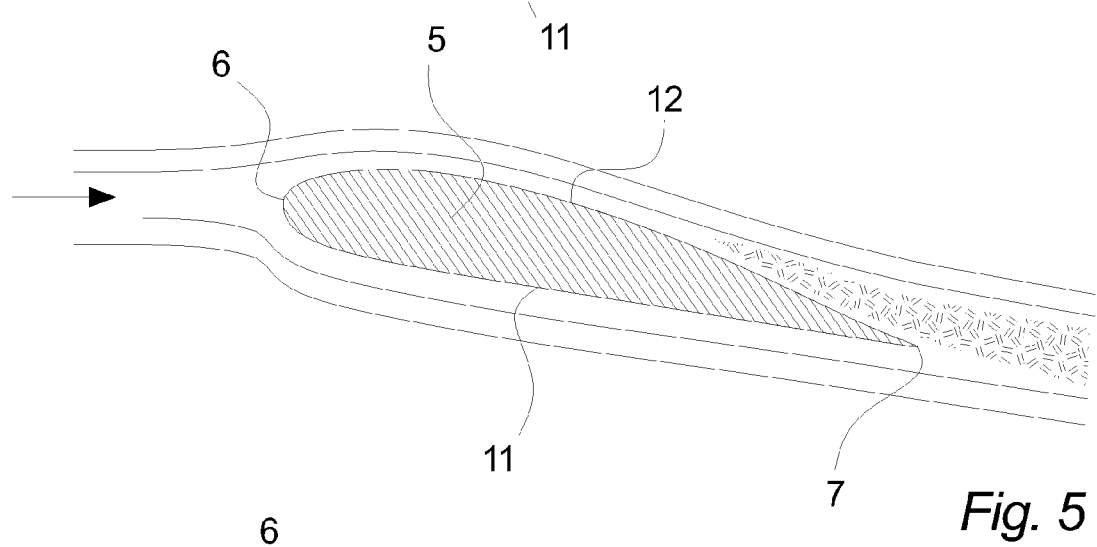
FIG. 5 illustrates a cross-section of a wind turbine blade in a stall situation, as seen from the root of the blade.

FIG. 5 illustrates a cross-section of a wind turbine blade 5 in a stall situation, as seen from the root 9 of the blade 5.

The blade 5 illustrated in FIG. 5 is a blade 5 on an active stall regulated wind turbine 1, shown during normal operation. In another embodiment it could also be a blade 5 on a pitch regulated wind turbine 1, illustrated during a sudden gust of wind creating an undesired stall situation.

Technically an active stall controlled wind turbine 1 resembles a pitch controlled wind turbine 1, in that they both have pitchable blades, and in order to get a reasonably large torque (turning force) at low wind speeds, the active stall controlled wind turbine 1 will usually be programmed to pitch the blades 5 much like a pitch controlled wind turbine 1 at low wind speeds. When the active stall controlled wind turbine 1 reaches its rated power, however, one will notice an important difference from the pitch controlled wind turbines 1: If the generator is about to be overloaded, the active stall controlled wind turbine 1 will pitch its blades 5 in the opposite direction from what a pitch controlled wind turbine 1 does. In other words, it will increase the angle of attack of the rotor blades 5 in order to make the blades 5 go into a deeper stall, thus wasting the excess energy in the wind. At high wind speeds the blades 5 of an active stall controlled wind turbine 1 will therefore have to be able to withstand a much higher extreme load than blades 5 of a pitch controlled wind turbine 1, both just to keep the blades 5 from breaking and to keep the blades 5 from bending so much that there is a risk of them hitting the tower 2. The blades 5 of an active stall controlled wind turbine 1 are therefore made more rugged and heavy than blades 5 of a pitch controlled wind turbine 1.

Furthermore, stall creates noise and to reduce the noise emission from the active stall controlled wind turbine 1 the rotor 4 rotates slower than the rotor 4 of a pitch controlled wind turbine 1. The blades 5 of an active stall controlled wind turbine 1 therefore have to be bigger and wider to be able to utilize the energy of the wind efficiently.

One of the advantages of active stall controlled wind turbines 1 compared to passive stall controlled wind turbines 1 is that the power output can be controlled more accurately, so as to avoid overshooting the rated power of the wind turbine 1 at the beginning of a gust of wind. Another advantage is that active stall controlled wind turbines 1 can be run almost exactly at rated power at all high wind speeds at least up to a certain maximum wind speed. A normal passive stall controlled wind turbine 1 will usually have a drop in the electrical power output for higher wind speeds, as the rotor blades 5 go into deeper stall.

Figure 6:
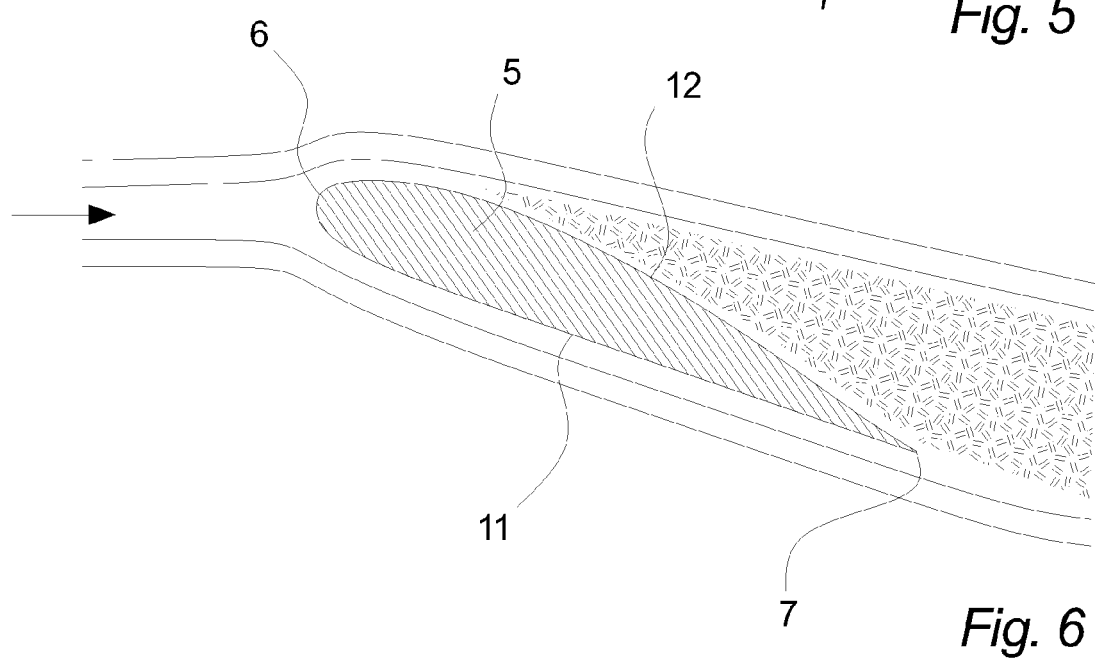
FIG. 6 illustrates a cross-section of a wind turbine blade in a deep stall situation, as seen from the root of the blade.

FIG. 6 illustrates a cross-section of a wind turbine blade 5 in a deep stall situation, as seen from the root 9 of the blade 5.

The blade 5 illustrated in FIG. 6 is a blade 5 on an active stall regulated wind turbine 1, shown during operation at very high wind speeds.

In this embodiment the blade 5 is pitched into the wind making it stall and substantially lose all the energy of the wind to protect the wind turbine 1 from damaging overloads.

Figure 7:
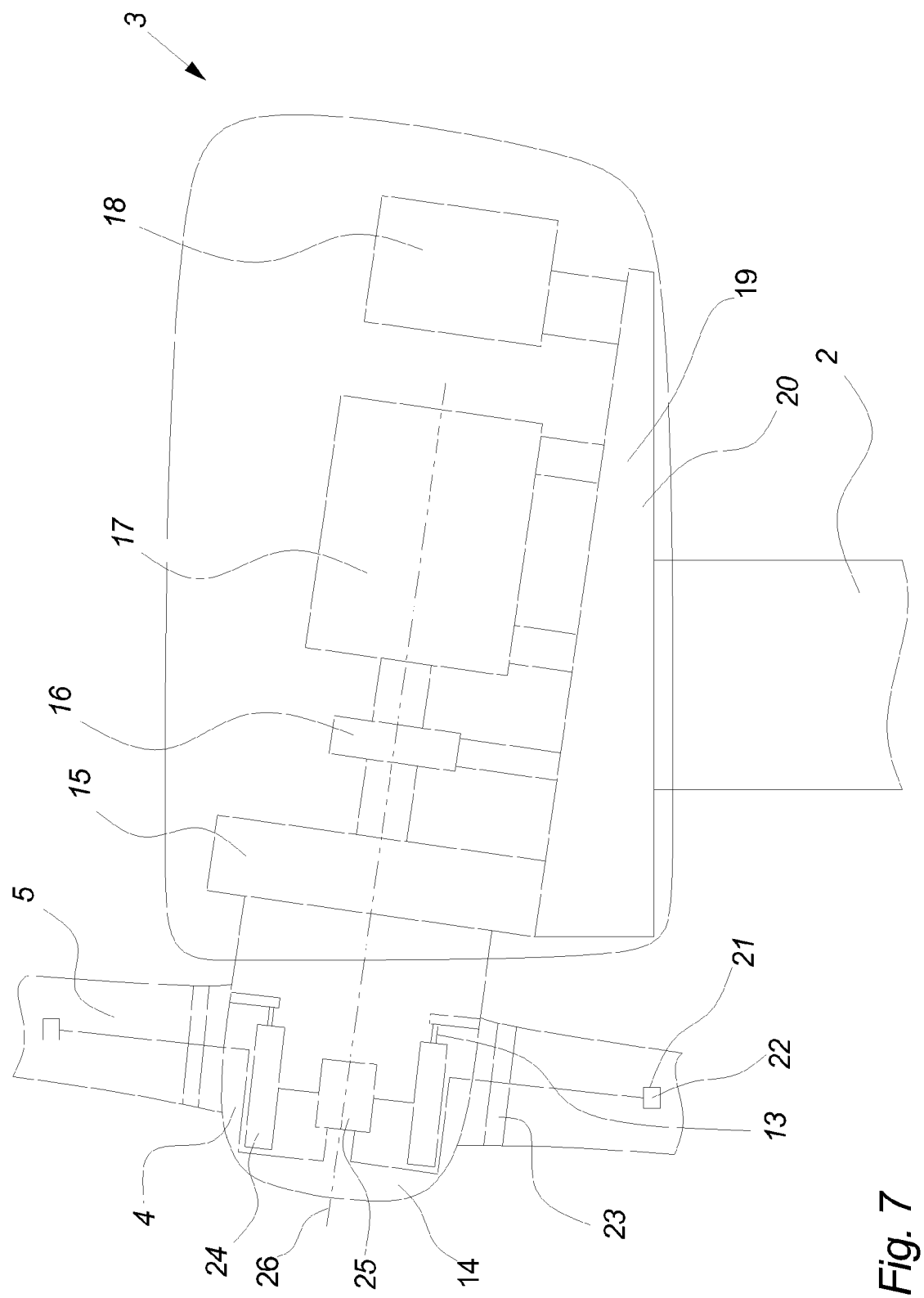
FIG. 7 illustrates a simplified cross section of a nacelle, as seen from the side.

FIG. 7 illustrates a simplified cross section of a nacelle 3 of an active stall regulated wind turbine 1, as seen from the side. Nacelles 3 exists in a multitude of variations and configurations but in most cases the drive train in the nacelle 3 comprise one or more of the following components: a gear 15, a coupling (not shown), some sort of breaking system 16 and a generator 17. A nacelle 3 of a modern wind turbine 1 can also include a converter 18 (also called an inverter) and additional peripheral equipment such as further power handling equipment, control cabinets, hydraulic systems, cooling systems and more.

The weight of the entire nacelle 3 including the nacelle components 15, 16, 17, 18 is carried by a strengthening structure 19. The components 15, 16, 17, 18 are usually placed on and/or connected to this common load carrying structure 19. In this simplified embodiment the strengthening structure 19 only extends along the bottom of the nacelle 3 e.g. in form of a bed frame 20 to which some or all the components 15, 16, 17, 18 are connected. In another embodiment the strengthening structure 19 could comprise a gear bell transferring the load of the rotor 4 to the tower 2, or the load carrying structure 19 could comprise several interconnected parts such as latticework.

In this embodiment of the invention the drive train is established in an angle in relation to a horizontal plane. The drive train is for among other reasons angled to enable that the rotor 4 can be angled correspondingly e.g. to ensure that the blades 5 do not hit the tower 2, to compensate for the differences in wind speed at the top and bottom of the rotor 4 and other.

In this embodiment of the invention oscillation sensors 21 are placed in each of the blades 5 to detect if the blades 5 oscillates edgewise. In that the amplitude of edgewise oscillations of a blade 5 will increase with the distance from the root 9 of the blade 5 the oscillation sensors 21 are in this embodiment of the invention accelerometers placed inside the blades 5 at a given distance from the root 9 of the blade.

In another embodiment of the invention the oscillation sensors 21 could be other types of sensors than accelerometers 22—such as microphones, strain-gauges, optical fibres or other, it or they could be placed differently in the blades 5 or the oscillation sensors 21 could be placed outside the blades 5 such as in or at the rotational axis 26 of a rotor 4 e.g. in the hub 14 centre or in the nacelle 3.

The oscillation sensors 21 are in this embodiment of the invention connected to control means 25. If edgewise oscillations of the blades 5 are detected or if edgewise oscillations above a certain level are detected, the control means 25 can initiate that one or more of the blades 5 are cyclically pitched.

As previously explained the blades 5 of an active stall regulated wind turbine 1 or a pitch regulated wind turbine are provided with a pitch mechanism 13. In the illustrated embodiment the blades 5 of the wind turbine 1 are connected to the hub 14 through pitch bearings 23, enabling that the blades can rotate around their longitudinal axis.

In this embodiment the pitch mechanism 13 comprise means for rotating the blades in the form of linear actuators 24 connected to the hub 14 and the respective blades 5. In a preferred embodiment the linear actuators 24 are hydraulic cylinders. In another embodiment the pitch mechanism 13 could comprise stepper motors or other means for rotating the blades 5.

In this embodiment the control means 25 is placed in the hub 14 but in a more preferred embodiment the control means 25 would be placed in the nacelle 3, in the tower 2, in a neighboring house or elsewhere e.g. at the same location as the general pitch control means (not shown) for the controlling the pitch in relation to load, power or other or even integrated in these general pitch control means.

In this embodiment the control means 25 are connected to the linear actuators 24 for controlling the pitch angle of the blades 5 in response to the measurements of the oscillation sensors 21.

If the edgewise oscillations has not dropped below a predetermined level within a predetermined period of time the control means 25 could comprise means for sending of an alarm and/or sending a signal initiating that the wind turbine was shut down. Likewise, if the edgewise oscillations continues to grow in size—even though the control means 25 cyclically sends a signal to counteract the oscillations by cyclically creating a pitch angle difference—an alarm signal and/or a signal to stop the wind turbine can be send.

The invention has been exemplified above with reference to specific examples of wind turbines 1, oscillation sensors 21, methods for damping edgewise oscillations and other. However, it should be understood that the invention is not limited to the particular examples described above but may be designed and altered in a multitude of varieties within the scope of the invention as specified in the claims.

What is claimed is:

1. A method for damping edgewise oscillations in one or more blades of a wind turbine, said method comprising the steps of detecting if one or more of said blades oscillates edgewise during operation of said wind turbine, and substantially cyclically generating a pitch angle difference between at least two of said blades, characterized in that said pitch angle difference between at least two of said blades generates an asymmetric load situation on a hub centre of a rotor to which said blades are attached, which asymmetric load situation substantially counter-phases an asymmetric load situation generated by said edgewise oscillations.

2. The method according to claim 1, wherein said pitch angle difference is only generated if a size of said edgewise oscillations is above a predefined level in one or more of said blades.

3. The method according to claim 1, wherein a size of said pitch angle difference is generated substantially directly proportional to a size of said edgewise oscillations.

4. The method according to claim 1, wherein a sum of the thrust provided by said blades are being substantially maintained when generating said pitch angle difference between at least two of said blades.

5. The method according to claim 1, wherein said pitch angle difference is generated by offsetting a pitch angle of at least a first blade in a first direction and offsetting a pitch angle of at least one further blade in an opposite direction of said first direction.

6. The method according to claim 5, wherein said offset is generated in addition to a normal pitch angle algorithm controlling the pitch angle of said blades in relation to normal wind turbine control parameters.

7. The method according to claim 1, wherein said edgewise oscillations are detected by use of one or more oscillation sensors placed in one or more of said blades.

8. The method according to claim 7, wherein said oscillation sensors are one or more accelerometers.

9. The method according to claim 1, wherein said edgewise oscillations are detected by use of one or more oscillation sensors placed in or at a rotational axis of a rotor on which said blades are mounted.

10. The method according to claim 1, wherein a gain of a control algorithm controlling a relation between said pitch angle difference and said edgewise oscillations is increased if a size of said edgewise oscillations rises above a predefined level.

11. The method according to claim 1, wherein a gain of a control algorithm is controlling a relation between time derivatives of said pitch angle difference and said edgewise oscillations.

12. An active stall controlled wind turbine comprising control means for carrying out a method according to claim 1.

13. Use of an active stall controlled wind turbine according to claim 12 in a wind turbine park comprising at least two active stall controlled wind turbines.

* * * * *

UNITED STATES PATENT AND TRADEMARK OFFICE
CERTIFICATE OF CORRECTION

| | |
|---|---|
| PATENT NO. | : 8,070,437 B2 |
| APPLICATION NO. | : 12/480374 |
| DATED | : December 6, 2011 |
| INVENTOR(S) | : Thomas Steiniche B. Nielsen et al. |

It is certified that error appears in the above-identified patent and that said Letters Patent is hereby corrected as shown below:

At column 1, line approx. 39, "such oscillations has caused" should read --such oscillations have caused--

At column 1, line approx. 41, "Both stall and pitch controlled wind turbine are in risk of being" should read --Both stall and pitch controlled wind turbines are at risk of being--

At column 1, line approx. 49, "oscillations of the blades is" should read --oscillations of the blades are--

At column 1, line approx. 60, "of cambers placed as close to the tip" should read --of chambers placed as close to the tip--

At column 2, line approx. 35, "this ability to cyclically generating a" should read --this ability to cyclically generate a--

At column 3, line approx. 17-18, "the sum of the thrust ... are being" should read --the sum of the thrust ... is being--

At column 3, line approx. 27, "oscillations is" should read --oscillations are--

At column 3, line approx. 44-45, "change being preformed to" should read --change being performed to--

At column 4, line approx. 9-10, "if the edgewise oscillations rises" should read --if the edgewise oscillations rise--

At column 4, line approx. 20, "more accurate in relation to" should read --more accurately in relation to--

Signed and Sealed this
Twenty-fourth Day of April, 2012

David J. Kappos
*Director of the United States Patent and Trademark Office*

At column 4, line approx. 28-29, "blades of ... stalls during" should read --blades of ... stall during--

At column 5, line approx. 18, "Each of ... comprise a tip 8" should read --Each of ... comprises a tip 8--

At column 5, line approx. 19, "each of the blades 5 are" should read --each of the blades 5 is--

At column 6, line approx. 3-4, "oscillations of the blades 5 is" should read --oscillations of the blades 5 are--

At column 6, line approx. 15-16, "forces originating from ... is by" should read --forces originating from ... are by--

At column 6, line approx. 55-56, "wind turbine 1 comprise" should read --wind turbine 1 comprises--

At column 7, line approx. 19, "how big a counter-phased forced is" should read --how big a counter-phased force is--

At column 7, line approx. 31, "it is possibly to" should read --it is possible to--

At column 7, line approx. 38-39, "not necessary so." should read --not necessarily so.--

At column 7, line approx. 50, "the turbines electronic" should read --the turbine's electronic--

At column 8, line approx. 14-15, "made relative long and slender," should read --made relatively long and slender,--

At column 9, line approx. 19, "drive train in ... comprise" should read --drive train in ... comprises--

At column 9, line approx. 46-47, "detect if the blades 5 oscillates" should read --detect if the blades 5 oscillate--

At column 10, line approx. 3, "pitch mechanism 13 comprise" should read --pitch mechanism 13 comprises--

At column 10, line approx. 14-15, "for the controlling the pitch" should read --for controlling the pitch--

At column 10, line approx. 21, "oscillations has not" should read --oscillations have not--

At column 10, line approx. 25-26, "oscillations continues to grow" should read --oscillations continue to grow--

At column 10, line approx. 29, "signal to ... can be send." should read --signal to ... can be sent.--

At column 10, line approx. 58-59, "wherein a sum of the thrust... are being substantially maintained when" should read --wherein a sum of the thrust ... is being substantially maintained when--